United States Patent
Wang

(10) Patent No.: US 9,813,174 B2
(45) Date of Patent: Nov. 7, 2017

(54) TIME CORRECTION METHOD AND APPARATUS FOR SLAVE CLOCK DEVICE

(71) Applicant: ZTE Corporation, Shenzhen (CN)

(72) Inventor: Bin Wang, Shenzhen (CN)

(73) Assignee: XI'AN ZHONGXING NEW SOFTWARE CO., LTD, Xi'An (CN)

(*) Notice: Subject to any disclaimer, the term of this patent is extended or adjusted under 35 U.S.C. 154(b) by 62 days.

(21) Appl. No.: 14/892,441

(22) PCT Filed: Apr. 18, 2014

(86) PCT No.: PCT/CN2014/075742
§ 371 (c)(1),
(2) Date: Nov. 19, 2015

(87) PCT Pub. No.: WO2014/187207
PCT Pub. Date: Nov. 27, 2014

(65) Prior Publication Data
US 2016/0119070 A1    Apr. 28, 2016

(30) Foreign Application Priority Data
May 20, 2013 (CN) .......................... 2013 1 0189138

(51) Int. Cl.
*H04J 3/06* (2006.01)
(52) U.S. Cl.
CPC .................................. *H04J 3/0667* (2013.01)
(58) Field of Classification Search
None
See application file for complete search history.

(56) References Cited

U.S. PATENT DOCUMENTS

| 2010/0085989 A1 | 4/2010 | Belhadj |
| 2010/0158183 A1* | 6/2010 | Hadzic ............... H03L 7/087 375/376 |

(Continued)

FOREIGN PATENT DOCUMENTS

| CN | 101615948 A | 12/2009 |
| CN | 102148652 A | 8/2011 |

(Continued)

OTHER PUBLICATIONS

Dr. Andre Vallat, "Clock Synchronization in Telecommunications via PTP (IEEE 1588)", Frequency Control Symposium, IEEE International, May 1, 2007, pp. 334-341, XP031137982.

(Continued)

*Primary Examiner* — Min Jung
(74) *Attorney, Agent, or Firm* — Cantor Colburn LLP

(57) ABSTRACT

Provided are a time correction method and a time correction apparatus for a slave clock device. The method is applied to a slave clock device, wherein the method includes: acquiring background traffic information, in a running process, of the slave clock device; acquiring a deviation correction value according to the background traffic information and a fitted function reflecting delay on an asymmetric link; and correcting a synchronization time, which is output from the slave clock device, in real time according to the deviation correction value. With the above technical solution, the technical problem in related art that there is no technical solution for effectively eliminating a dynamic delay change of an asymmetric link due to a background traffic change is solved, thereby greatly reducing the impact of the traffic change on the asymmetric link delay.

11 Claims, 2 Drawing Sheets

(56) References Cited

U.S. PATENT DOCUMENTS

2011/0261917 A1* 10/2011 Bedrosian ............. H04J 3/0667
375/371
2013/0039359 A1 2/2013 Bedrosian
2013/0294307 A1* 11/2013 Johansson ......... H04W 52/0209
370/311

FOREIGN PATENT DOCUMENTS

CN 102664696 A 9/2012
WO 2012038644 A1 3/2012

OTHER PUBLICATIONS

European Search Report for corresponding application EP14801775; Report dated Feb. 25, 2016.
International Search Report for corresponding application PCT/CN2014/075742 dated Apr. 18, 2014; dated Jul. 9, 2014.

* cited by examiner

TIME CORRECTION METHOD AND APPARATUS FOR SLAVE CLOCK DEVICE

TECHNICAL FIELD

The present disclosure relates to the field of clock synchronization, and in particular to a time correction method for a slave clock device.

BACKGROUND

Precision Time Protocol (PTP) IEEESTD 1588 is one of the important technologies in the field of time and frequency synchronization control. During practical applications, link asymmetry always is a difficult point troubling synchronization performance.

So called link asymmetry refers to that the downlink transmission speed is inconsistent with the uplink transmission speed in a network between a master clock device and a slave clock device (which is also called a slave device in this disclosure), which leads to a deviation between the time calculated by the slave clock device and the time calculated by the master clock device.

Static deviation can be measured in a steady state of the network and can be corrected by the setting of an asymmetric correction value on network devices. Dynamic deviation includes two conditions. One condition might be approximate to a random error; this type of dynamic deviation with high randomness generally long lasts in a certain frequency range, and can be eliminated by a specific filter designed on a device. The other condition is impacted by network transmission factors, and cannot be eliminated by a common filtering method.

Generally, for the asymmetry in a network, besides the correction of static deviation, the link delay change caused by forward delay in a normal link is eliminated by a transparent transmission function of clock nodes. The transparent transmission function puts the delay of the current level of transmission into a protocol message, the delay continues to be accumulated and transmitted by subsequent nodes; when the slave clock node receives the protocol packet, this part of delay is removed to greatly eliminate the impact from the link delay change.

However, if there is one or more intermediate devices on the link not supporting the transparent transmission function, for example, when the transmission is conducted via a third-party network, since the link asymmetric change caused by transmission delay on these network nodes is easy to reach a big value, a common slave clock device can not handle this condition, which directly blocks the application of 1588 clock services in existing networks.

In view of the above problem, no solution has been put forward so far.

SUMMARY

In view of the technical problem in related art that there is no technical solution for effectively eliminating a dynamic delay change of an asymmetric link due to a background traffic change, the embodiments of the present disclosure provide a time correction method for a slave clock device, to at least solve the above problem According to one embodiment of the present disclosure, a time correction method for a slave clock device is provided, which is applied to a slave clock device and includes: acquiring background traffic information, in a running process, of a slave clock device; acquiring a deviation correction value according to the background traffic information and a fitted function reflecting delay on an asymmetric link; and correcting a synchronization time, which is output from the slave clock device, in real time according to the deviation correction value.

In an example embodiment, the fitted function is acquired in a manner as follows: acquiring delay information of the asymmetric link under each background traffic template in different flow rates; and constructing the fitted function by performing function fitting based on the delay information.

In an example embodiment, acquiring the deviation correction value according to the background traffic information and the fitted function reflecting the delay on the asymmetric link includes: receiving the deviation correction value from a network management device, wherein the deviation correction value is acquired by the network management device according to the background traffic and the fitted function.

In an example embodiment, acquiring the deviation correction value according to the background traffic information and the fitted function reflecting the delay on the asymmetric link includes: receiving the background traffic information from a network management device, wherein the background traffic information is acquired by the network management device from an intermediate device; acquiring the deviation correction value using the fitted function according to the received background traffic information.

In an example embodiment, acquiring the deviation correction value according to the background traffic information and the fitted function reflecting the delay on the asymmetric link includes: receiving the background traffic information sent by an intermediate device; acquiring the deviation correction value using the fitted function according to the received background traffic information.

In an example embodiment, acquiring the deviation correction value according to the background traffic information and the fitted function reflecting the delay on the asymmetric link includes: receiving the deviation correction value from an intermediate device, wherein the deviation correction value is acquired by the intermediate device according to the background traffic information and the fitted function.

In an example embodiment, after correcting the synchronization time, which is output from the slave clock device, in real time according to the deviation correction value, the method further includes: filtering the synchronization time that is corrected in real time.

According to another embodiment of the present disclosure, a time correction apparatus for a slave clock device is provided, which is applied to a slave clock device and includes: a first acquisition component, which is configured to acquire background traffic information, in a running process, of the slave clock device; a second acquisition component, which is configured to acquire a deviation correction value according to the background traffic information and a fitted function reflecting delay on an asymmetric link; and a correction component, which is configured to correct a synchronization time, which is output from the slave clock device, in real time according to the deviation correction value.

In an example embodiment, the above apparatus further includes: a third acquisition component, which is configured to acquire delay information of the asymmetric link under each background traffic template in different flow rates, and to construct the fitted function by performing function fitting based on the delay information.

In an example embodiment, the above apparatus further includes: a filtering component, which is configured to filter the synchronization time that is corrected in real time.

Through the technical means of the embodiments of the present disclosure, a deviation correction value can be acquired according to the background traffic information and the fitted function reflecting the delay on the asymmetric link and a synchronization time, which is output from the slave clock device, can be corrected in real time according to the deviation correction value. The technical solution solves the technical problem in related art that there is no technical solution for effectively eliminating a dynamic delay change of an asymmetric link due to a background traffic change, thereby greatly reducing the impact of the traffic change on the asymmetric link delay.

BRIEF DESCRIPTION OF THE DRAWINGS

For a better understanding of the present disclosure, accompanying drawings described hereinafter are provided to constitute one part of the application; the schematic embodiments of the present disclosure and the description thereof are used to illustrate the present disclosure but to limit the present disclosure improperly. In the accompanying drawings.

DETAILED DESCRIPTION OF THE EMBODIMENTS

The present disclosure is described below in detail by reference to the accompanying drawings in conjunction with embodiments. It should be noted that the embodiments in the application and the characteristics of the embodiments can be combined if no conflict is caused.

Figure 1:
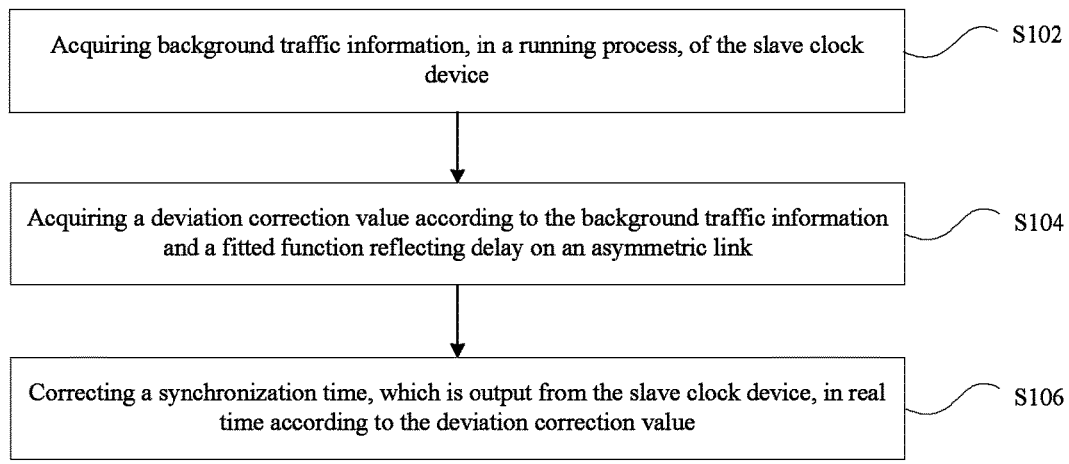
FIG. 1 shows a flowchart of a time correction method for a slave clock device according to an embodiment of the present disclosure.

FIG. 1 shows a flowchart of a time correction method for a slave clock device according to an embodiment of the present disclosure. The method is applied to a slave clock device, and as shown in FIG. 1, the method includes the following steps S102 to S106.

In step S102, background traffic information of the slave clock device in a running process is acquired.

In step S104, a deviation correction value is acquired according to the background traffic information and a fitted function reflecting delay on an asymmetric link.

In S106, a synchronization time, which is output from the slave clock device, is corrected in real time according to the deviation correction value.

Through each of the above steps, since a deviation correction value can be acquired according to the background traffic information and the fitted function reflecting the delay on the asymmetric link, the real-time state of the background traffic is considered when the time of the slave clock device is corrected. In this way, the dynamic delay change of the asymmetric link caused by the background traffic change can be eliminated, and the impact of the traffic change on the asymmetric link delay can be greatly reduced.

In this embodiment, the slave clock device might include but should not be limited to: a device based on 1588 clock synchronization protocols.

The fitted function may be acquired in a manner as follows. Delay information of the asymmetric link under each background traffic template in different flow rates is acquired; and the fitted function is constructed by performing function fitting based on the delay information. The procedure is specifically described as follows in detail.

Figure 4:
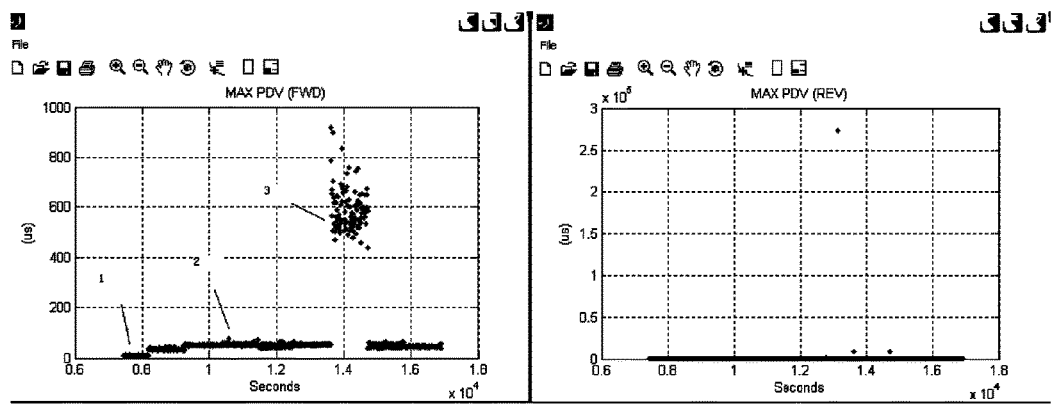
FIG. 4 shows a diagram of the change condition of link delay jitter in different input traffics according to an embodiment of the present disclosure.

From actual measurements it is found that the change of link delay on common switch devices is highly correlated to the flow rates of message traffics on devices and the composition of traffics (FIG. 4 shows the change condition of link delay jitter in different input traffics in one measurement process).

If measurement is performed on a gradually changing proportion of positive to reverse traffic based on a specific traffic template, a proportion model for the correspondence between the proportion of positive to reverse traffic and the asymmetry generated to a switch device can be obtained.

According to different traffic templates, if the proportion coefficient of large, medium and small packets is changed gradually, a proportion model for the correspondence between different traffic templates and asymmetry generated to a switch device can be obtained.

The above two proportion models may serve as the fitted function indicating the correlation of the background traffic information and the delay situation of an asymmetric link. According to the above two models, an asymmetric parameter (that is, deviation correction value) generated on a device can be estimated according to the flow rates of traffics on the device and the composition of traffics on the device.

In this embodiment, there are multiple methods to implement step S104, for example, the following methods may be adopted: (1) receiving the deviation correction value from a network management device, wherein the deviation correction value is acquired by the network management device according to the background traffic information and the fitted function; (2) receiving the background traffic information from a network management device, wherein the background traffic information is acquired by the network management device from an intermediate device; acquiring the deviation correction value using the fitted function according to the received background traffic information; (3) receiving the background traffic information sent by an intermediate device; acquiring the deviation correction value using the fitted function according to the received background traffic information; (4) receiving the deviation correction value from an intermediate device, wherein the deviation correction value is acquired by the intermediate device according to the background traffic information and the fitted function. In this way, by sending the background traffic information obtained via sampling to the slave clock device via the intermediate device, or sending the asymmetric parameter estimated on the intermediate device to the slave clock device, or receiving the background traffic information or asymmetric parameter sent by the network management device, this embodiment can correct the link asymmetry in real time, and thus can greatly reduce the computation time error on a slave clock device caused by link asymmetry due to the traffic characteristic change of an intermediate device.

For the minor error caused by variation of sizes of messages and the transmission delay of traffic information, there is still a small asymmetric deviation on the slave clock device. When such deviation is reduced to a certain degree, the remaining deviation which is less than an allowed clock synchronization error can be eliminated by the slave device filtering, that is, after the synchronization time output by the slave clock device is corrected according to the deviation correction value, the synchronization time that is corrected in real time may be further filtered.

Figure 2:
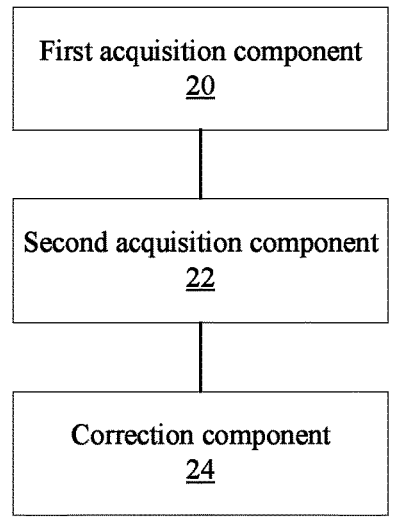
FIG. 2 shows a structure diagram of a time correction apparatus for a slave clock device according to an embodiment of the present disclosure.

This embodiment also provides a time correction apparatus for a slave clock device, which is applied to the slave clock device to implement the above method. Components involved in this apparatus can be realized through software or hardware. FIG. 2 shows a structure diagram of a time correction apparatus for a slave clock device according to an embodiment of the present disclosure. As shown in FIG. 2, the apparatus includes:

a first acquisition component 20, which is coupled with a second acquisition component 22 and is configured to acquire background traffic information, in a running process, of the slave clock device;

a second acquisition component 22, which is coupled with a correction component 24 and is configured to acquire a deviation correction value according to the background traffic information and a fitted function reflecting delay on an asymmetric link; and a correction component 24, which is configured to correct a synchronization time, which is output from the slave clock device, in real time according to the deviation correction value.

Through the function realized by the above components, this embodiment also can eliminate the dynamic delay change of an asymmetric link due to a background traffic change, thereby greatly reducing the impact of the traffic change on the asymmetric link delay.

Figure 3:
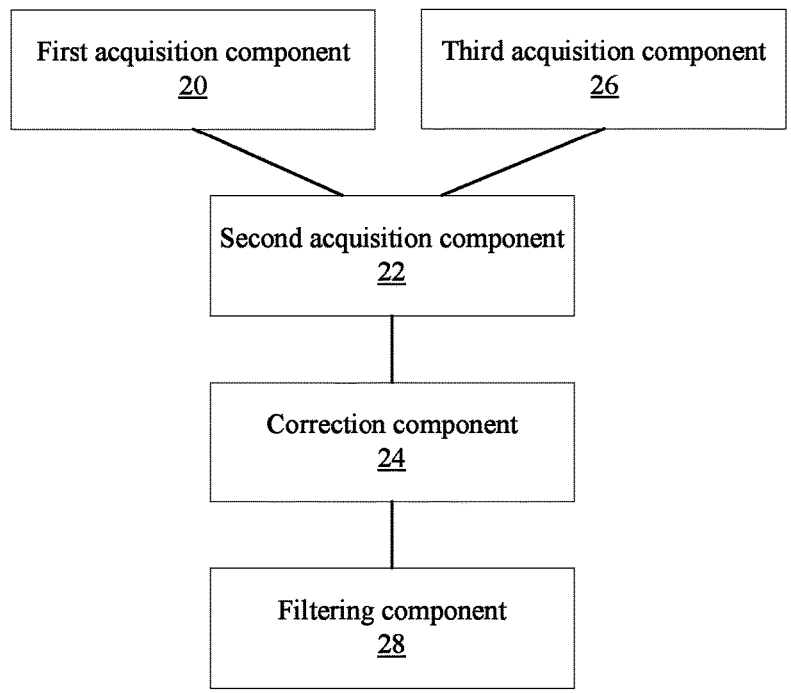
FIG. 3 shows another structure diagram of a time correction apparatus for a slave clock device according to an embodiment of the present disclosure.

In this embodiment, as shown in FIG. 3 the apparatus further includes: a third acquisition component 26, which is coupled with the second acquisition component 22 and is configured to acquire delay information of the asymmetric link under each background traffic template in different flow rates, and to construct the fitted function by performing function fitting based on the delay information.

In this embodiment, as shown in FIG. 3 the apparatus might further include but should not be limited to include: a filtering component 28, which is coupled with the correction component 24 and is configured to filter the synchronization time that is corrected in real time.

To better understand the above embodiment, a detailed description is provided below in conjunction with an example embodiment. The principle of this example embodiment is as follows.

Calibration stage: according to the general condition of network services, multiple traffic templates with different proportions of large, medium and small packets are created to compose background traffics to be added to an intermediate device, and the message traffics at all levels on ports are measured; then, the asymmetry change value of a link is measured in these background traffic conditions; after several measurements, a fitted function between the background traffic parameter and the asymmetric deviation is obtained by a non-linear fitting method.

Running stage: a network management device monitors the background traffic information or the asymmetric deviation, or an intermediate device actively sends the background traffic parameter to a slave device, or the intermediate device directly sends to the slave clock device an asymmetric deviation calculated by the fitted function; the slave clock device calculates an asymmetric deviation value according to the received background traffic parameter or directly performs compensation according to the received asymmetric deviation value.

In this example embodiment, the processing method of the network clock synchronization device includes following steps:

Step A: in the case of no background traffic, asymmetry is measured, the output of the slave device has no deviation.

Step B: in the calibration stage, different background traffic templates are input at different flow rates, link delay is measured and recorded. Hereinafter a detailed description is provided.

Supposing three background traffic templates x, y, z are used, and the flow rates are set as a, b, c in the calibration, specifically:

inputting the background traffic template x at flow rate a, measuring and recording link delay;

inputting the background traffic template x at flow rate b, measuring and recording link delay;

inputting the background traffic template x at flow rate c, measuring and recording link delay;

inputting the background traffic template y at flow rate a, measuring and recording link delay;

inputting the background traffic template y at flow rate b, measuring and recording link delay;

inputting the background traffic template y at flow rate c, measuring and recording link delay;

inputting the background traffic template z at flow rate a, measuring and recording link delay;

inputting the background traffic template z at flow rate b, measuring and recording link delay;

inputting the background traffic template z at flow rate c, measuring and recording link delay;

Step C: non-linear fitting is made according to the records to obtain a fitted function between the background traffic information and the asymmetric link delay.

Step D: in the running stage, a network management monitoring device obtains the background traffic information of an intermediate device, and converts the background traffic information into an asymmetric deviation correction value; or, after obtaining the background traffic information of the intermediate device, the network management monitoring device directly sends the background traffic information to the slave device which then calculates the asymmetric deviation correction value according to the background traffic information; or, the intermediate device actively sends to the slave device the asymmetric deviation correction value converted from the background traffic information; or, the intermediate device actively sends the background traffic information to the slave device, which then calculates the asymmetric deviation correction value according to the background traffic information.

Step E: the slave device corrects time in real time according to the obtained asymmetric deviation correction value.

Step F: the slave device filters the output time that is corrected, to reduce jitter.

To sum up, this embodiment achieves the following effects.

An asymmetric deviation value in a specific background traffic is calculated according to the fitted function of the traffic and asymmetry, the problem of dynamic delay change of an asymmetric link due to a background traffic change is solved. By using the technical solution of the above embodiment, it is easy to reduce the asymmetric deviation caused by the intermediate device background traffic to an acceptable scope; for example, an error of tens of microseconds or even greater in the time synchronization of the slave device caused by the change of traffic on the intermediate device can be reduced to tens of nanoseconds, and the jitter caused by a traffic change is further reduced by filtering at the output of the slave device. In this way, the impact of the traffic change on the asymmetric link delay can be greatly reduced. If a more comprehensive traffic template can be adopted to calibrate in the calibration stage, the asymmetry problem caused by a traffic change can be thoroughly eliminated theoretically.

Obviously, those skilled in the art should understand that the components or steps described above can be implemented by a common computer device; the components or steps can be integrated on a single computing device or distributed on a network composed of a plurality of computing devices; optionally, the components or steps can be implemented by a programming code executable by a computing device, thus they can be stored in a storage device to be executed by a computing device and executed in a different order in some cases, or manufactured into individual integrated circuit component respectively, or several of them can be manufactured into a single integrated circuit component to implement; in this way, the present disclosure is not limited to any combination of specific hardware and software.

The above are only the example embodiments of the present disclosure and not intended to limit the present disclosure. For those skilled in the art, various modifications and changes can be made to the present disclosure. Any modification, equivalent substitute and improvement made within the principle of the present disclosure are intended to be included in the scope of protection defined by the claims of the present disclosure.

INDUSTRIAL APPLICABILITY

The above technical solution provided in the embodiments of the present disclosure can be applied to the time correction of a slave clock device. Through the technical means of acquiring a deviation correction value according to the background traffic information and a fitted function reflecting delay on an asymmetric link and correcting a synchronization time, which is output from the slave clock device, in real time according to the deviation correction value, the embodiments of the present disclosure can solve the technical problem in related art that there is no technical solution for effectively eliminating a dynamic delay change of an asymmetric link generated by a background traffic change, thereby greatly reducing the impact of the traffic change on the asymmetric link delay.

What is claimed is:
1. A time correction method for a slave clock device, wherein the time correction method comprises:
acquiring background traffic information, in a running process, of the slave clock device;
acquiring a asymmetric deviation correction value according to the background traffic information and a fitted function reflecting delay on an asymmetric link; and
correcting a synchronization time, which is output from the slave clock device, in real time according to the asymmetric deviation correction value;
wherein the fitted function is acquired in a manner as follows:
acquiring delay information of the asymmetric link under each background traffic template in different flow rates; and constructing the fitted function by performing function fitting based on the delay information.
2. The method as claimed in claim 1, wherein acquiring the asymmetric deviation correction value according to the background traffic information and the fitted function reflecting the delay on the asymmetric link comprises:
receiving the asymmetric deviation correction value from a network management device, wherein the asymmetric deviation correction value is acquired by the network management device according to the background traffic and the fitted function.
3. The method as claimed in claim 2, wherein after correcting the synchronization time, which is output from the slave clock device, in real time according to the asymmetric deviation correction value, the method further comprises:
filtering the synchronization time that is corrected in real time.
4. The method as claimed in claim 1, wherein acquiring the asymmetric deviation correction value according to the background traffic information and the fitted function reflecting the delay on the asymmetric link comprises:
receiving the background traffic information from a network management device, wherein the background traffic information is acquired by the network management device from an intermediate device; and acquiring the asymmetric deviation correction value using the fitted function according to the received background traffic information.
5. The method as claimed in claim 4, wherein after correcting the synchronization time, which is output from the slave clock device, in real time according to the asymmetric deviation correction value, the method further comprises:
filtering the synchronization time that is corrected in real time.
6. The method as claimed in claim 1, wherein acquiring the asymmetric deviation correction value according to the background traffic information and the fitted function reflecting the delay on the asymmetric link comprises:
receiving the background traffic information sent by an intermediate device; and acquiring the asymmetric deviation correction value using the fitted function according to the received background traffic information.
7. The method as claimed in claim 6, wherein after correcting the synchronization time, which is output from the slave clock device, in real time according to the asymmetric deviation correction value, the method further comprises:
filtering the synchronization time that is corrected in real time.
8. The method as claimed in claim 1, wherein acquiring the asymmetric deviation correction value according to the background traffic information and the fitted function reflecting the delay on the asymmetric link comprises:
receiving the asymmetric deviation correction value from an intermediate device, wherein the asymmetric deviation correction value is acquired by the intermediate device according to the background traffic information and the fitted function.
9. The method as claimed in claim 1, wherein after correcting the synchronization time, which is output from the slave clock device, in real time according to the asymmetric deviation correction value, the method further comprises:

filtering the synchronization time that is corrected in real time.

10. A time correction apparatus for a slave clock device, wherein the time correction apparatus comprises:
a first acquisition component, which is configured to acquire background traffic information, in a running process, of the slave clock device;
a second acquisition component, which is configured to acquire a asymmetric deviation correction value according to the background traffic information and a fitted function reflecting delay on an asymmetric link; and
a correction component, which is configured to correct a synchronization time, which is output from the slave clock device, in real time according to the asymmetric deviation correction value;
wherein the time correction apparatus further comprises:
a third acquisition component, which is configured to acquire delay information of the asymmetric link under each background traffic template in different flow rates, and to construct the fitted function by performing function fitting based on the delay information.

11. The apparatus as claimed in claim 10, wherein the time correction apparatus further comprises:
a filtering component, which is configured to filter the synchronization time that is corrected in real time.

* * * * *